Dec. 26, 1961     M. M. JONES     3,014,703
SEAL FOR ROTATABLE TYPE REGENERATOR

Filed July 13, 1959     2 Sheets-Sheet 1

Inventor:
Mack M. Jones

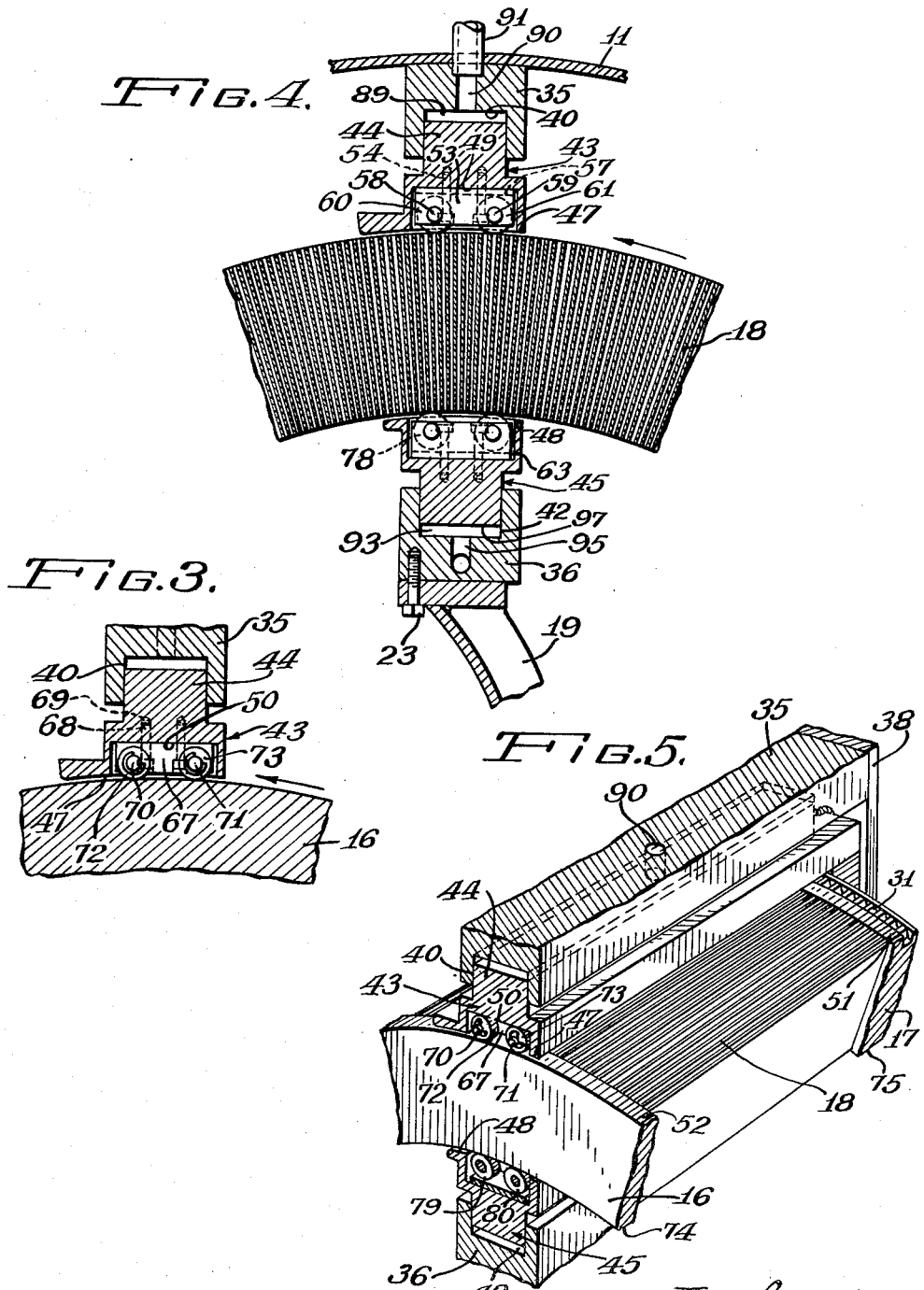

United States Patent Office 3,014,703
Patented Dec. 26, 1961

3,014,703
SEAL FOR ROTATABLE TYPE REGENERATOR
Mack M. Jones, Western Springs, Ill., assignor to International Harvester Company, Chicago, Ill., a corporation of New Jersey
Filed July 13, 1959, Ser. No. 826,499
4 Claims. (Cl. 257—269)

This invention relates to a sealing means between chambers in a rotary type heat exchanger. More in particular this invention relates to a sealing member for a rotary type regenerator wherein the sealing member engages the rotor in rolling relation thereby substantially reducing friction and accompanying power requirement for driving the rotor as well as reducing wear on the engaging surfaces.

Heretofore, fluid sealing means employed in rotary regenerators comprised elements mounted in slidably engaging frictional relation with the rotor. These forms of sealing means while effective result in excessive friction necessitating considerable power requirements for driving the rotor. Particularly where the regenerator is employed with an internal combustion engine such as a turbine, this excessive power requirement for the regenerator obviously reduces the overall efficiency of the machine. Furthermore where high friction between slidable parts occurs, the wear rate of the engaging parts is also greater thus reducing the useful life of such parts.

It is therefore a prime object of this invention to provide a resilient fluid sealing member for a rotary regenerator wherein friction is reduced substantially between the rotor and the relatively stationary sealing member.

A further object of this invention is to provide a resilient fluid sealing member for a rotary regenerator wherein the wearing rate between the movable and stationary parts is reduced substantially.

Another object of this invention is to provide a fluid sealing member according to the preceding objects wherein the sealing member is provided with rollable elements in engaging relation with the rotor.

A yet further object of this invention is to improve the efficiency of a rotary regenerator by reducing the power requirements for driving the rotor.

These and other important and desirable objects inherent in and encompassed by the invention will be more readily understood from the ensuing description of a preferred embodiment, the appended claims and the annexed drawings wherein:

FIGURE 3 is a transverse elevation, in section and partly broken away, taken on line 3—3 of FIGURE 2 showing the detailed construction of the rollable elements of a portion of the sealing member of this invention positioned in engaging relation with the rotor.

FIGURE 4 is a transverse elevation, in section and partly broken away, illustrating the inner and outer portions of the resilient sealing member of this invention in engaging relation with the rotor.

FIGURE 5 is a perspective view, partly in section and partly broken away, illustrating the view of FIGURE 4 in three dimensions.

Figure 1:
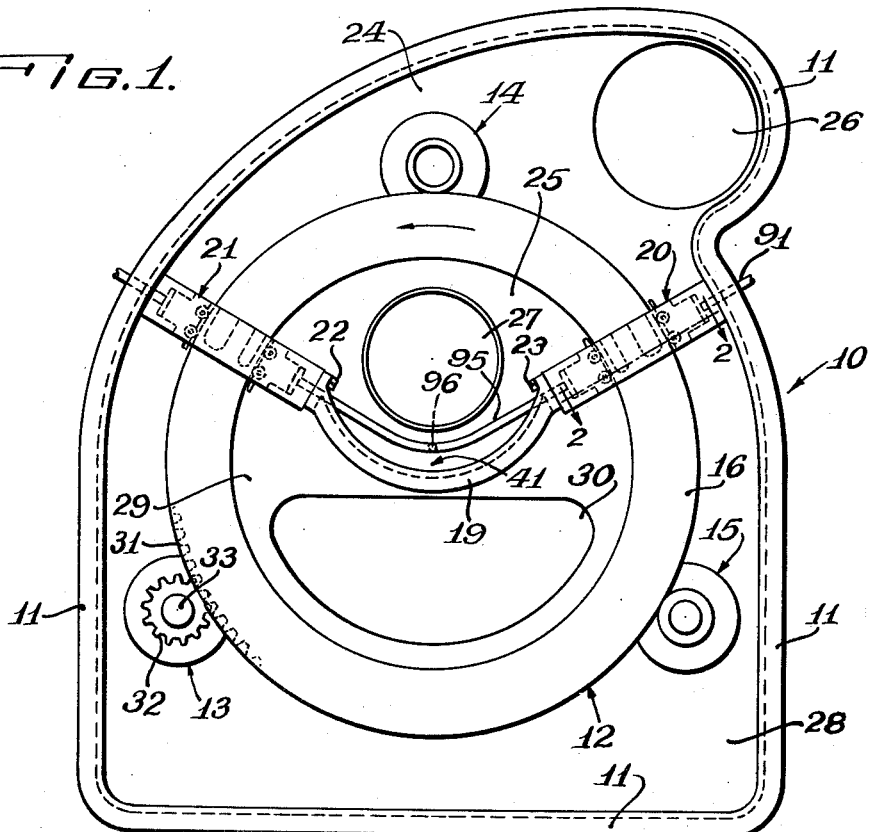
FIGURE 1 is an end elevation of a rotary regenerator with the front of the housing or casing removed illustrating the rotor and partition means forming a pair of fluid chambers including a pair of sealing members according to this invention.

With continued reference to the drawings FIGURE 1 illustrates the general arrangement of a rotary regenerator indicated at 10 of the type used with a gas driven turbine. The regenerator comprises a housing or casing 11 having a cylindrically shaped rotor 12 supported in driven rotatable relation on the front and/or rear walls of the casing 11. The rotor is supported conventionally by rollers such as at 13, 14 and 15 journalled to the casing 11 which cooperates with a peripheral track positioned at one or both ends of the rotor such as at 51 and 52. In the embodiment shown the rotor 12 is of the type having an annular front wall 16 and an annular rear wall 17 supporting a cylindrically shaped permeable matrix 18 therebetween. The matrix 18 may comprise a series of rectangularly shaped fins in circumferentially spaced radially disposed relation as seen in FIGURES 4 and 5. Thus fluid may pass through the matrix 18 in a radial direction but not in a circumferential direction.

Mounted longitudinally on the rear and/or front walls of the casing 11 is a partition 19 connected to the inner extremities of a pair of sealing members generally indicated at 20 and 21 such as by bolts, two of which are shown at 22 and 23. Each of the sealing members 20 and 21 is provided with a generally rectangular shaped aperture to accommodate movement of the rotor 12 therethrough as evident from FIGURE 1. Thus it may be seen that the wall 19 and sealing members 20 and 21 with the casing divides the regenerator 10 into an upper compartment above the wall 19 and a lower compartment below the wall 19 and sealing members 20 and 21. The upper compartment is further divided into two chambers by a portion of the rotor, the one being the cold air plenum 24 and the other being the hot air plenum 25. Cold air enters the plenum 24 through the cold air inlet port 26 disposed in the housing 11 and passes radially through the matrix of the adjoining portion of the rotor 12 into the hot air plenum 25 and passes into the hot air outlet port 27 communicatively connected to the turbine combustor (not shown). The lower compartment also is further divided into two chambers by a portion of the rotor, the first being the cold exhaust plenum 28 and the second being the hot exhaust plenum 29. Hot exhaust gas from the turbine enters the plenum 29 through the intake port 30 and passes radially outwardly through the matrix 18 of the rotor 12 into the plenum 28 and thence discharged through a suitable port (not shown) in the casing 11.

In order to rotate drivingly the rotor 12, the annular rear wall 17 may include a peripherally disposed ring gear having outwardly positioned teeth 31 as best shown in FIGURE 5. At least one of the rollers 13, 14 and 15 is provided with a pinion gear 32 positioned for meshed relation with the teeth 31 on the rotor 12. The pinion 32 is connected to a drive shaft 33 in drive relation, the shaft 33 in turn being connected to a source of rotative power (not shown). Thus when the shaft 33 is rotated drivenly, the rotor 12 rotates about its longitudinally disposed cylindrical axis 41.

The foregoing is a general description of a conventional rotary regenerator which operates in the following manner. Hot exhaust gas from a turbine enters the hot exhaust plenum 29 through the intake port 30. The hot exhaust gas passes radially through the matrix 18 of the adjacent portion of the rotor 12 into the cold exhaust plenum 28 and thereafter discharged through a port (not shown) in the casing 11. As the hot gas passes through the matrix 18, heat is imparted to the fins of the matrix. Now as the rotor 12 rotates in a counterclockwise direction as in FIGURE 1, the heated matrix 18 passes through the sealing member 20 between the plenums 24 and 28. Cold air under pressure enters the plenum 24 through the port 26 and passes radially inward through the heated fins of the matrix 18 into the plenum 25. The heat in the hot matrix 18 is imparted to the compressed air thereby elevating its temperature in reaching the plenum 25 and is thereafter conducted to the combustor (not shown) through the port 27. The loss of heat in the matrix 18 lowers the temperature thereof significantly upon reaching the sealing member 21. After passage through the sealing member 21 the matrix is again reheated by the hot exhaust gas flowing therethrough from the plenum 29 to the plenum 28. From this it can be seen that the continuous movement of the air and gas with the rotor results in a continuous operation of transferring heat from the hot exhaust gas to the compressed air thereby elevating the temperature of the compressed air to the combustor. In other words the regenerator effectively recovers heat from the turbine's exhaust gas which is then used for pre-heating the compressed air required for the combustor apparatus to increase the overall efficiency of the turbine thus utilizing some of the exhaust gas heat which would otherwise be wasted.

In the light of the above general discussion it can be seen from FIGURE 1 that the primary purpose of the fluid sealing members 20 and 21 is to prevent effectively the passage of elastic fluids between the plenums 24 and 25 with the plenums 28 and 29 by circumferential flow or blow-by of fluid between each of the sealing members 20 and 21 and the portions of the rotor encompassed thereby. This invention is directed to an improved construction of these sealing members one of which will now be described in detail, the other being identical thereto.

Figure 2:
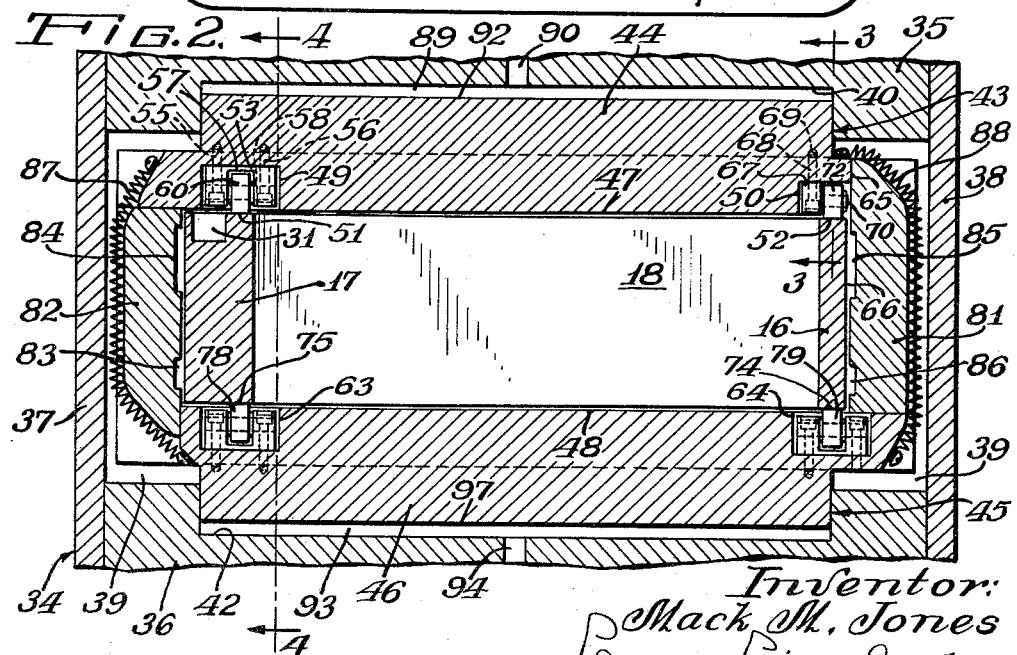
FIGURE 2 is a longitudinal elevation, in section and partly broken away, taken on line 2—2 of FIGURE 1 illustrating the detailed construction of a resilient sealing member according to this invention.

The resilient sealing member 20 includes a rigid frame generally indicated at 34 mounted on the inner wall of the casing 11 in rigid relation. The frame 34 comprises a longitudinally disposed outer element 35 and an inner element 36 in opposed relation connected together rigidly by tie-plates 37 and 38 as best shown in FIGURES 2 and 5 forming a rectangularly shaped opening 39. The longitudinal inner edge of the inner element 36 is connected in supporting relation with the partition 19 such as by a series of bolts one of which is shown at 23 in FIGURE 1. The outer element 35 of the frame 34 is provided with a longitudinally disposed groove or slot 40 of rectangular cross-section positioned in spaced relation parallel to the axis of rotation 41 of the rotor 12. The slot 40 faces inwardly toward the opening 39. Similarly the inner element 36 is provided with a groove or slot 42 of rectangular cross-section facing toward the opening 39 of the frame 34. The slot 42 is positioned in parallel spaced relation with respect to the slot 40.

Disposed longitudinally in the opening 39 adjacent to the outer element 35 of the frame 34 is a first or external shoe generally indicated at 43. The shoe 43 is provided with a projection 44 fitted slidably into the slot 40 for movement in a radial direction with respect to the axis of rotation 41 in piston-like relation. Also disposed longitudinally in the opening 39 adjacent to the inner element 36 of the frame 34 is a second or internal shoe generally indicated at 45. The shoe 45 is provided with a projection 46 fitted slidably into the slot 42 for movement in a radial direction with respect to the axis of rotation 41 in piston-like relation. It will be observed that the two shoes 43 and 45 are in opposed relation.

The longitudinal faces 47 and 48 of the shoes 43 and 45, respectively, are positioned parallel to the outer and inner peripheral extremities of the rotor 12 as may be evident from FIGURES 2 to 5. At each end of the shoe 43 rectangular shaped recesses 49 and 50 are provided and positioned in adjacent relation to the tracks 51 and 52, respectively, formed by the outer peripheral surfaces of the front and rear annular end walls 16 and 17 of the rotor 12. In the recess 49 is mounted a block 53 secured to the shoe 43 by screws, three of which are shown at 54, 55 and 56 (FIGURES 2 and 3) threadedly fit into suitable bores in the shoe 43. The block 53 is provided with a transverse slot 57 spanned by a pair of longitudinally disposed pins 58 and 59. Journalled in the transverse slot 57 on the pins 58 and 59 are a pair of rollable elements or wheels 60 and 61. The wheels 60 and 61 are positioned in alignment with the track 51 of the rotor 12 rolling relation therewith.

On the other or front end of the shoe 43 it will be seen that the rectangular recess 50 extends to the outer edge 65 of the shoe to a transverse plane slightly forward of the external face 66 of the wall 16 of the rotor 12 for a purpose which will become apparent later herein. Owing to space limitations as may be evident from FIGURE 2, the recess 50 is smaller in a longitudinal direction than the recess 49 heretofore described. Within the recess 50 there is positioned a block 67 rigidly secured to the shoe 43 by a bolt 68 threadedly fit into a corresponding bore 69 therein. The block 67 is provided with two forwardly extending stub shafts 70 and 71 having rollers or wheels 72 and 73, respectively, journalled thereto. The wheels 72 and 73 are positioned in alignment with the track 52 in rolling relation as seen in FIGURES 2, 4 and 5.

On the inner periphery of the annular walls 16 and 17 there is provided tracks respectively at 74 and 75. The internal shoe 45 is provided in the recess 63 with a pair of wheels, one of which is shown at 78 (FIGURE 2), journalled in alinement for rolling on the track 75 of the wall 17 of the rotor 12, said wheels being mounted in the same manner as the wheels 60 and 61 of the external shoe 43. Likewise the front end of the internal shoe 45 is provided with journalled wheels 79 and 80 mounted in the recess 64 in alinement for rolling on the track 74 of the wall 16, said wheels being mounted in the same manner as the wheels 60 and 61 of the external shoe 43.

Referring to FIGURE 2 in abutting but slidable relation with the front and rear ends of the shoes 43 and 45 there is disposed a front plate 81 and a rear plate 82. The transverse grooves 83, 84, 85 and 86 are open to the sides toward the compressed air plenums 24 and 25 but do not extend transversely to communicate with the exhaust plenums 28 and 29. The purpose of the grooves 83 to 86 are merely to permit the compressed air to exert forces on the plates 81 and 82 in a direction opposed to the urging of tension springs 87 and 88. The springs 87 and 88 are anchored to the shoes 43 and 45 as shown and positioned to secure resiliently or yieldably the plates 81 and 82. This arrangement permits some flexibility in the movement of the shoes 43 and 45 in respect to the plates 81 and 82 to allow shifting for compensating irregularities in the rotor 12 such as distortion of the rotor due to temperature variations. Thus the sealing members 20 and 21 are yieldable to conform with minor distortion of the rotor 12 while moving therethrough without loss of sealing efficiency.

Now while the tension springs 87 and 88 do urge the shoes 43 and 45 towards each other for engaging the eight wheels into engagement with the tracks of the rotor 12, it is desirable to provide additional controllable means for urging the shoes in the direction for engaging the rotor so that maximum sealing efficiency is obtained. Referring to FIGURE 2 it will be seen that the projection 44 of the shoe 43 in the slot 40 forms a chamber 89. The outer element 35 is provided with a port 90 in communication with the chamber 89. Communicatively connected to the port 90 is a conduit 91 (FIGURE 1) leading to a controllable source of fluid pressure (not shown). Fluid pressure applied to the conduit 91 increases the pressure in the chambers 89 which in turn acts on the surface 92 of the projection 44 in a piston-like manner. Thus a fluid pressure motivated force is applied to the shoe 43 to urge it radially inwardly for pressure engagement with the rotor 12. In a similar manner the projection 46 of the shoe 45 forms a chamber 93 with the slot 42. The inner element 36 is provided with a port 94 in communication with the chamber 93. The port 94 is connected communicatively with a conduit 95 (FIGURE 1) leading to the aforesaid source of fluid pressure through the casing 11 such as at 96. Fluid pressure applied to the conduit 95 elevates the pressure in the chamber 93 which in turn acts on the surface 97 of the projection 46 in a piston-like manner. Thus a fluid pressure motivated force is applied to the shoe 45 to urge it radially outwardly for pressure engagement with the rotor 12.

From the foregoing it should be apparent that by proper positioning of the rollable elements the clearance between the faces 47 and 48, respectively, of shoes 43 and 45, and the rotor 12 may be held to a minimum consistent with good manufacturing practice for obtaining good sealing relation. At the same time the friction between the rotor 12 and the sealing members 20 and 21 is reduced greatly thus significantly lowering the power requirement for rotating the rotor 12 at the shaft 33 and thereby elevate the overall power output efficiency of the turbine.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. For a heat exchanger of the kind described having a casing and a hollow cylindrically shaped rotor mounted for rotation therein, said exchanger having a partition disposed within the hollow portion of said rotor and connected to said casing, said rotor having an annular front end wall and an annular rear end wall with a permeable matrix disposed therebetween adapted to conduct fluid therethrough in a radial direction; a pair of resilient sealing members each comprising a frame mounted on said casing and connected to said partition defining two chambers within said casing, each of said frames having an opening therethrough positioned to encompass a sectoral portion of said rotor, a first slot longitudinally disposed in the outer portion of each of said frames, a second slot longitudinally disposed in the inner portion of each of said frames, a first shoe disposed in each of said frames in adjacent relation with the outer peripheral surfaces of said annular end of said rotor walls, said first shoes each having a first projection longitudinally disposed outwardly thereof, said first projection of each of said shoes being positioned in said first slot of each respective frame for slidable movement in a radial direction, a second shoe disposed in each of said frames in adjacent relation with the inner peripheral surfaces of said annular end walls, said second shoes each having a second projection longitudinally disposed inwardly thereof, said second projection of each of said second shoes being positioned in said second slot of each respective frame for slidable movement in a radial direction, said first shoes each having a pair of first wheels positioned in rolling relation with each of the outer peripheral surfaces of said annular end walls, said second shoes each having a pair of second wheels positioned in rolling relation with the inner peripheral surfaces of said annular end walls, a front end plate positioned for sliding engagement with the front surface of said front annular end wall and said shoes, a rear end plate positioned for sliding engagement with the rear surface of said rear annular end wall and said shoes, tension spring means connecting said shoes and engaging said end plates for urging said wheels and said plates in abutting relation with said annular end walls, and a source of fluid pressure communicated to said slots for urging in a radial direction said shoes and said wheels in sealing relation with said annular end walls whereby fluid from one chamber adjacent to one side of said sealing members is precluded from passage to the other chamber adjacent to the other side of said sealing members between said shoes and said rotor.

2. For a heat exchanger of the kind described having a casing and a hollow cylindrically shaped rotor mounted for rotation therein, said exchanger having a partition disposed within the hollow portion of said rotor and connected to said casing, said rotor having an annular front end wall and an annular rear end wall with a permeable matrix disposed therebetween adapted to conduct fluid therethrough in a radial direction; a pair of resilient sealing members each comprising a frame mounted on said casing and connected to said partition defining two chambers within said casing, each of said frames having an opening therethrough positioned to encompass a sectoral portion of said rotor, a first slot longitudinally disposed in the outer portion of each of said frames, a second slot longitudinally disposed in the inner portion of each of said frames, a first shoe disposed in each of said frames in adjacent relation with the outer peripheral surfaces of said annular end walls, said first shoes each having a first projection longitudinally disposed outwardly thereof, said first projection of each of said shoes being positioned in said first slot of each respective frame for slidable movement in a radial direction, a second shoe disposed in each of said frames in adjacent relation with the inner peripheral surfaces of said annular end walls, said second shoes each having a second projection longitudinally disposed inwardly thereof, said second projection of each of said second shoes being positioned in said second slot of each respective frame for slidable movement in a radial direction, said first shoes each having a plurality of first rollable elements positioned in rolling relation with each of the outer peripheral surfaces of said annular end walls, said second shoes each having a plurality of second rollable elements positioned in rolling relation with the inner peripheral surfaces of said annular end walls, a front plate positioned for sliding engagement with the front surface of said front annular end wall and said shoes, a rear end plate positioned for sliding engagement with the rear surface of said rear annular end wall and said shoes, tension spring means connecting said shoes and engaging said end plates for urging said rollable elements and said plates in abutting relation with said annular end walls, and a source of fluid pressure communicated to said slots for resiliently urging in a radial direction said shoes and said rollable elements in sealing relation with said annular end walls whereby fluid from one chamber adjacent to one side of said sealing members is precluded from passage to the other chamber adjacent to the other side of said sealing members between said shoes and said rotor.

3. For a heat exchanger of the kind described having a casing and a hollow cylindrically shaped rotor mounted rotatably therein, said exchanger having a partition disposed within the hollow portion of said rotor and connected to said casing, said rotor having an annular front end wall and an annular rear end wall with a permeable matrix disposed therebetween adapted to conduct fluid therethrough in a radial direction; a pair of resilient sealing members each comprising a frame mounted on said casing and connected to said partition defining two chambers within said casing, each of said frames having an opening therethrough positioned to encompass a sectoral portion of said rotor, a first slot longitudinally disposed in the outer portion of each of said frames, a second slot longitudinally disposed in the inner portion of each of said frames, a first shoe disposed longitudinally in each of said frames in adjacent relation with a sectoral portion of the outer peripheral surface of said rotor, said shoes each having a first projection longitudinally disposed outwardly thereof positioned in cooperative relation respectively with each of said first slots for slidable movement in a radial direction, a second shoe disposed longitudinally in each of said frames in adjacent relation with the said sectoral portion of the inner peripheral surface of said rotor, said shoes each having a second projection longitudinally disposed inwardly thereof positioned in cooperative relation respectively with each of said second slots for slidable movement in a radial direction, each of said shoes having a plurality of rollable elements positioned in rolling relation with said rotor, a front plate positioned for sliding engagement with the front surface of said front annular end wall and said shoes, a rear end plate positioned for sliding engagement with the rear surface of said rear annular end wall and said shoes, resilient means connected to said shoes and engaging said plates for urging said rollable elements and said plates in abutting relation with said annular end walls, and a source of fluid pressure communicated to said slots for resiliently urging in opposed radial direction said shoes in sealing relation with said rotor whereby fluid from one chamber adjacent to one side of said sealing members is precluded from passage to the other chamber adjacent to the other side of said sealing members between said shoes and said rotor.

4. For a heat exchanger of the kind described having a casing and a hollow cylindrically shaped rotor mounted rotatably therein, said exchanger having a partition disposed within the hollow portion of said rotor and connected to said casing, said rotor having an annular front end wall and an annular rear end wall supporting a permeable matrix therebetween adapted to conduct fluid therethrough in a radial direction; a pair of resilient sealing members each comprising a frame mounted on said casing and connected to said partition defining two chambers within said casing, each of said frames having an opening therethrough positioned to encompass a sectoral portion of said rotor, a radially movable first shoe disposed longitudinally in each of said frames in adjacent relation with a sectoral portion of the outer peripheral surface of said rotor, a radially movable second shoe disposed longitudinally in each of said frames in adjacent relation with the said sectoral portion of the inner peripheral surface of said rotor, means on each of said frames for supporting said shoes in opposed relation, each of said shoes having a plurality of rollable elements positioned in rolling relation with said rotor, a front plate positioned for sliding engagement with the front surface of said front annular end wall and said shoes, a rear end plate positioned for sliding engagement with the rear surface of said rear annular end wall and said shoes, resilient means connected to said shoes and engaging said plates for urging said rollable elements and said plates in abutting relation with said annular end walls, and power means disposed on said frame positioned for resiliently urging in opposed radial direction said shoes in sealing relation whereby fluid from one chamber adjacent to one side of said sealing members is precluded from passage to the other chamber adjacent to the other side of said sealing members between said shoes and said rotor.

References Cited in the file of this patent

UNITED STATES PATENTS

| | | |
|---|---|---|
| 2,631,870 | Hodson | Mar. 17, 1953 |
| 2,643,097 | Bowden et al. | June 23, 1953 |
| 2,888,248 | Bubniak et al. | May 26, 1959 |
| 2,893,699 | Bubniak | July 7, 1959 |

FOREIGN PATENTS

| | | |
|---|---|---|
| 813,248 | Great Britain | May 13, 1959 |